May 30, 1933.  W. F. SCHACHT  1,912,312
SINK STOPPLE
Filed April 14, 1932
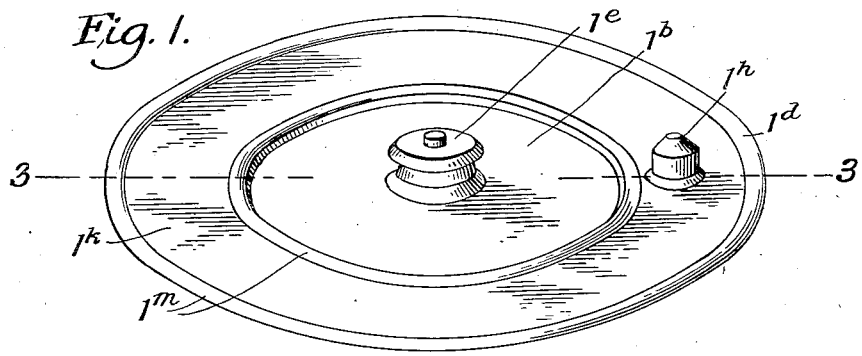
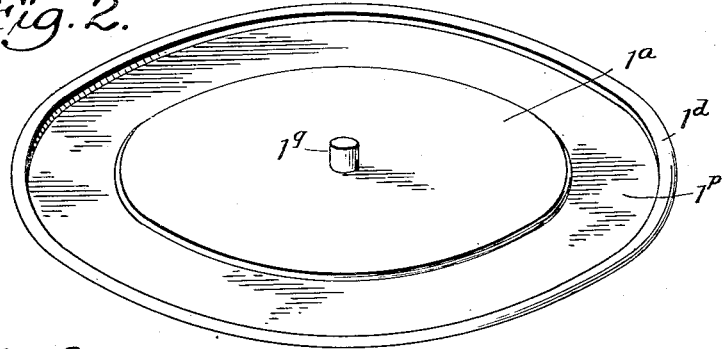
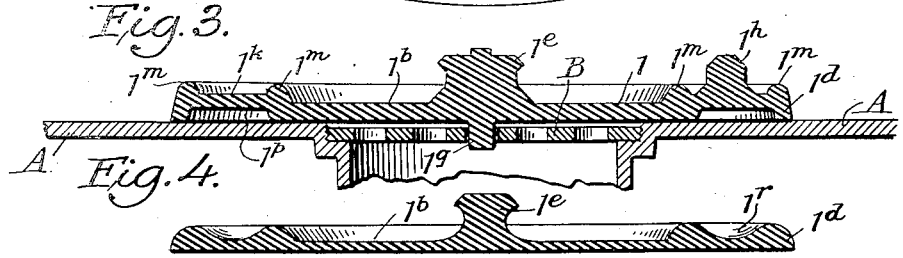
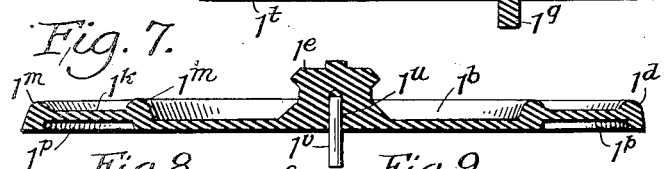
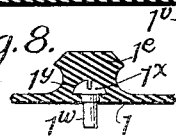
Inventor
William F. Schacht
By Alexander ...
Attorney Patented May 30, 1933

1,912,312

UNITED STATES PATENT OFFICE

WILLIAM F. SCHACHT, OF HUNTINGTON, INDIANA

SINK STOPPLE

Application filed April 14, 1932. Serial No. 605,328.

This invention relates to all-rubber sink stopples, and is an improvement upon that shown in U. S. Letters Patent #1,646,112 issued to me on October 18, 1927, which patent discloses a stopple comprising a thin rubber disk of substantial uniform thickness having a flat lower face, and having an integral thick side rim portion, with a centrally disposed integral handle, and a knob on the rim portion for breaking the suction under the stopple to release the same.

All-rubber sink stopples, now in general use, are usually made heavy at their centers and taper down to a feather-edge at the rim, and hence have a tendency to curl at the edge after short use, and soon become useless. In my aforesaid patent this curling was partly overcome, but in the improved sink stopple, forming the subject-matter of the present application, the center of the stopple is made thin while at the rim is a heavy flange with an annular recess, whereby when the stopple is placed in the sink, the suction at the center of the stopple shuts the water off, and the heavy rim keeps the stopple from curling, and the recess in the heavy rim creates a double vacuum, which provides a more efficient stopple.

The principal object therefore of my invention is to provide a sink stopple of the type shown in my prior patent, designed to create a double vacuum rather than a single vacuum to prevent the sink stopple from curling, and to cause the rim to lay flat on the sink. The heavy rim of the stopple is provided with recesses in its upper, lower, or both faces to create the double vacuum.

A further object is to provide an all-rubber molded sink stopple having an integral rubber centering pin at its center on the lower side, said pin being adapted to engage any of the perforations in the usual sink strainer to prevent the stopple from sliding so as to uncover the strainer and permit seepage of water past the stopple; also to provide a metallic pin, instead of the integral rubber pin held by the resiliency of the rubber in a bore in the underside of the stopple; also to provide a molded recess in the bottom of the rubber stopple adapted to receive a headed pin readily insertable in the recess to perform the same function, both the straight pin or headed pin being readily removable so that the sink stopple may be used either with or without the centering pin; also to provide a sink stopple having a rubber centering pin molded on its bottom, said rubber pin being reinforced by a metallic pin or the like, whereby the stopple will have the appearance of an all-rubber sink stopple; at the same time the rubber facing around the metallic pin will prevent the pin from scratching the enamel in the sink.

I will explain the invention with reference to the accompanying drawing which illustrates several practical forms of the invention to enable others to adopt and use the same; and will summarize in the claims the novel features of construction, and novel combinations of parts, for which protection is desired.

In said drawing:

Fig. 1 is a top perspective view of one form of molded all-rubber sink stopple.

Fig. 2 is a bottom perspective view thereof.

Fig. 3 is a section on the line 3—3, Fig. 1 showing in section the sink drain and strainer to which the stopple is applied.

Fig. 4 is a section similar to Fig. 3, but showing a modified form of stopple in which the centering pin and the recess in the lower face of the thickened rim is omitted.

Fig. 5 is a section similar to Fig. 3, but showing a still further modification.

Fig. 6 is a section similar to Fig. 3 and showing a still further modification, utilizing the centering pin and the recess on the underside of the rim.

Fig. 7 is a section similar to Fig. 3 but showing a removable metallic centering pin held in a bore in the stopple by the resiliency of the rubber.

Fig. 8 is a partial section showing a removable metallic centering pin having a head inserted in a correspondingly shaped recess in the underside of the rubber stopple.

Fig. 9 is a partial section showing a metallic reinforcement molded in the rubber centering pin, the reinforcement being completely covered by rubber during the molding process.

As shown in Figs. 1, 2 and 3, the sink stopple preferably comprises a thin molded circular disk-like body portion 1 of elastic material, preferably of soft flexible rubber, so that the same will readily conform with the contour of the sink surface A (Fig. 3) upon which the stopple is placed. The body portion may be of any suitable diameter, and its lower face 1a is preferably flat, and adapted to contact directly with a sink strainer B (Fig. 3). In the upper face of the stopple is provided a circular recess 1b, concentric with the vertical axis of the stopple whereby the central portion of the stopple is much thinner than the edge or rim portion 1d of the same. If desired one or more integral annular ribs (not shown), concentric with the vertical axis of the stopple may be provided upon the upper face of the stopple within the recess 1b to prevent warping of the thin central portion.

The rim portion 1d of the stopple is molded thicker than the central portion thereof to prevent the edges of the stopple from curling or becoming out of shape, thereby insuring that the stopple will effectively prevent the liquid from passing the same, and the thick rim furthermore strengthens the periphery of the stopple.

At the center of the stopple projecting from its upper face is an integral knob 1e, of any desired shape, whereby the stopple may be readily handled. If desired the lug 1e may be reinforced with fabric or canvas.

In Figs. 1–3 the rim portion 1d is provided in its upper face with an annular recess 1k leaving ribs 1m at each side of the recess 1k; and rim 1d is provided with an annular recess 1p in its lower face whereby the rim 1d is rendered much thinner at its center than at each side, and thereby creating a vacuum under the flange 1d which with the vacuum under the central portion 1b forms a double vacuum effectively holding the stopple down upon the sink or other surface.

Upon the rim portion 1d of the stopple is molded an integral knob 1h adapted to form a handle whereby the thick rim 1d of the stopple may be readily raised to break the suction under the stopple, when it is desired to release same.

By making the central portion of the stopple thin and the rim portion heavy, a greater suction is created to hold the stopple in place, and when the stopple is so placed in the sink it is almost impossible to pull same away from the sink by the knob 1e, but when it is desired to remove or release the stopple from the sink the rim 1d may be readily raised by lifting the knob 1h, thereby breaking the suction under the stopple, whereby same may be readily removed.

I further provide (Figs. 1–3) an integral centering pin 1q molded in the body adapted to enter any one of the holes in the sink strainer B (Fig. 3) to prevent the stopple from slipping sidewise to uncover the drain. The pin 1q being made of rubber will not scratch or mar the enamel of the sink.

The stopple thus molded of all-rubber is effective, strong, and flexible, and will form a water-tight closure over the sink strainer or drain.

In Fig. 4 the recess in the bottom of the rim 1d is omitted, and the centering pin and the lifting knob on the rim portion may or may not be provided. The upper recess 1r in the rim is preferably slightly rounded whereby the sink stopple can be more readily cleaned, there being no sharp corners in the recess in which dirt or grease may collect and adhere to the stopple. As the central portion of the thickened rim 1d is thinner than the edges of the rim, a vacuum under the rim portion 1d will be created, and the stopper thus formed has the same double vacuum feature above explained with respect to Figs. 1–3; and as the stopple also has the thickened rim portion 1d the stopple will not curl at its edges.

In Fig. 5 the upper recess in the upper face of the rim 1d is omitted and the upper surface is convexly rounded. A recess 1s is provided in the bottom face of the rim, which recess similarly provides the double vacuum feature of the sink stopple, and the thickened rim 1d prevents curling of the edge.

In Fig. 6 a modified form is shown in which the heavy rim 1d extends inwardly toward the center further than in Fig. 5, and the recess 1t in the underside of the thickened rim is provided. In this modification the integral rubber centering pin 1q is also provided on the bottom of the stopple. The stopple is made rather thin at the center and then thickens out to the edge to provide a heavy rim which will keep the rubber from curling, while the thin center makes it flexible, and shuts the water off quickly when it is applied to the sink.

In Fig. 7 the stopple shown is substantially the same as in Fig. 3, but a bore 1u is provided in the rubber which extends up into the central lifting knob 1e, which bore is somewhat smaller than a metallic pin 1v inserted therein, whereby the pin 1v will be retained in the bore 1u by the resiliency of the rubber. The pin 1v however may be readily removed, if desired, and the stopple used without the pin.

In Fig. 8 a modified form is shown in which a pin 1w having an enlarged partiglobular head 1x is entered into a correspondingly shaped recess 1y molded in the rubber. The rubber will readily give sufficiently to permit the head 1x to be inserted in or withdrawn from the recess 1y, and the stopple may be used without the pin 1w if desired.

In Fig. 9 the rubber pin 1q is reinforced by a metallic insert 1z molded therein during the process of molding the rubber. The pin 1z being of smaller diameter than the portion of the mold will permit the rubber to flow around the pin as at 1q during the molding process and coat the reinforcing pin with rubber to prevent the metal from scratching the enamel of the sink.

All forms of stopples may be molded with or without the knob 1h or centering pins 1q or 1w.

I claim:

1. A stopple made of thin molded rubber having a central portion of substantially uniform thickness and a flat lower face, said stopple having an integral thick wide rim portion; a centrally disposed knob integral with the central portion; and an annular recess in the rim portion whereby a vacuum is provided both under the central portion and under the rim portion.

2. In combination with a stopple as set forth in claim 1, a cylindrical removable centering pin on the bottom of the stopple engaging a bore in the knob, the pin being retained in the bore by the resiliency of the rubber.

3. In a stopple as set forth in claim 1, the annual recess being disposed in the upper face of the rim portion.

4. In a stopple as set forth in claim 1, the annular recess being disposed in the bottom face of the rim portion.

5. In a stopple as set forth in claim 1, the annular recess being disposed on the top and bottom faces of the rim portion.

6. A stopple comprising a thin molded rubber disk of substantially uniform thickness having a flat lower face, and having a rim portion; a centrally disposed handle; and a centering pin on the bottom of the stopple, said pin being straight and engaging a bore in the stopple, the pin being retained in the bore by the resiliency of the rubber.

7. A stopple made of thin molded rubber having a central portion of substantial uniform thickness and a flat lower face, said stopple having an integral thick wide rim portion; a centrally disposed knob integral with the central portion; an annular recess in the rim portion whereby a vacuum is provided both under the central portion and under the rim portion; and an integral centering pin on the bottom of the stopple.

WILLIAM F. SCHACHT.